March 9, 1965     E. M. WORMSER     3,173,019
RADIANT TARGET LOCATOR

Filed Dec. 27, 1960     2 Sheets-Sheet 1

*INVENTOR.*
ERIC M. WORMSER

BY

*ATTORNEY*

United States Patent Office

3,173,019
Patented Mar. 9, 1965

3,173,019
RADIANT TARGET LOCATOR
Eric M. Wormser, 65 Nutmeg Lane, Stamford, Conn.
Filed Dec. 27, 1960, Ser. No. 78,393
8 Claims. (Cl. 250—232)

This invention relates to an improved radiant target locator and more particularly to a target locator operating on radiation which is not suitable for visual observation or photographic or television purposes. The principal type of radiation involved is infrared.

There are a number of problems in which it becomes necessary to locate a small radiant target in a predetermined field where the radiation from the target is such that it can be observed visually or by photographic or television means. The whole field of view is under continuous observation and the problems of detector sensitivity and speed of response do not create serious problems. Thus while the present invention can be used with any optical radiation, that is to say radiation of wavelength sufficiently short to obey optical laws accurately, it is rarely of advantage in the wavelength range to which the eye, photographic emulsions or television cameras are sensitive. Therefore, while these radiations are not excluded from the broadest aspect of the present invention it is particularly useful and solves particularly serious problems when infrared radiation is used of wavelength sufficiently long so that it cannot be sensed by photographic emulsions or television cameras.

The problem of locating a small target by infrared in a large field of view presents some formidable problems. One or more infrared detectors are employed and it is necessary to scan the field of view so that the detector scans over minute portions thereof. The scanning may either be by moving the field of view across a detector or moving a detector across the field of view. Various types of scanning are used such as the well known television raster type in which the scanning is in successive lines which, as in television, will be referred to as horizontal and vertical, or other types of scan such as spiral scans may be used. In every case the space is broken up into enormous number of minute portions and the detector must see each one separately in sequence during a single scan. This presents an enormous problem in the infrared because of the fact that for the most part detectors have relatively long time constants. Where the detectors are thermal detectors such as bolometers or thermocouples, and these are the only kind of detectors that can be used in the far infrared, it has not been practical in the past to develop detector time constants much shorter than about a millisecond or at least a respectable fraction thereof. Therefore, if it is attempted to scan too rapidly detector sensitivity falls off to the point where the instrument is not useful. As a result infrared cameras or other devices requiring scanning of a predetermined area have had very slow scans often of the order of one or more minutes. With stationary targets or extremely slow moving targets at great distances such scanning systems have been useful but they are, of course, entirely incapable of handling the problem of a very rapidly moving target.

It is also possible to obtain the location of a target by trackers, that is to say devices which keep aimed at the target as it moves, and from the motions of the whole tracker in altitude and azimuth the coordinates of a particular target can be read off. Infrared trackers have achieved spectacular successes but they are extremely complicated, heavy and very costly instruments and so the need for a light, simple and economical target locator using infrared and comparable to visual or television sighting devices has remained unfulfilled. It is with a solution of this problem that the present invention deals.

To visualize the problem in more concrete terms let us assume a field of view which is square and in which it is desired to know the location of a radiant target with an accuracy of one percent. If an ordinary television type of raster is used this means that there would be 100 lines and that in scanning across these lines the detector would have to move sufficiently slowly so that one hundredth part of a line would fall within the detector's time constant. Assuming now an infrared detector with a 0.5 to 1 millisecond time constant it would have to move across a single line in 0.1 second, then it has to scan the next line and so on so that the total scan requires more than 10 seconds. For a stationary target or a very slow moving one this is not a prohibitive time but for a fast moving target such an instrument is not useful. According to the present invention a system scans over the whole field of view just once. In the concrete instance given above this would be fixed by the time for any one line or the 0.1 second, something that would be entirely impossible with the ordinary scanning system for then it would be necessary to have a detector of less than 10 $\mu$sec. time constant which is difficult or impossible with most thermal detectors.

The problem is solved by the present invention by causing detector response simultaneously to give information about both coordinates of the target. For simplicity the invention will be described first with an ordinary television raster although as will be pointed out further on this is not the only type of scanning which can be used. A large detector is used which sees the whole field of view and this field of view is scanned across the detector in only one direction. Each scan gives information on both coordinates of the target. Between the detector and the space it is to cover there is interposed a reticle on which the space is imaged by suitable optics. The detector sees the field to be searched by the radiation which passes through the reticle. The reticle is divided into a series of strips. In the case of the requirement for 1 percent vertical resolution, 100 horizontal strips. Each strip is composed of a series of transparent and opaque sections usually referred to in reticles as bars and each strip has a different number of bars, for example, the lowest strip may have 100 bars with succeeding strips larger and larger numbers. The detector is connected to an A.C. amplifier and thus background radiation which is not chopped by the bars of the reticle is eliminated. Very large objects will be chopped but little if at all and will evoke very small responses from the detector. However, a small radiant target will be chopped by the successive bars in whatever strip on which it appears. The signal from the small target will, therefore, actuate the amplifier or putting it another way the detector amplifier combination is blind to background, sees only very dimly if at all large objects but sees clearly a small target which is fully chopped. As the scan sweeps across the reticle the target will be chopped at a frequency determined by the number of bars in the strip and this information can be processed by suitable electronic circuits which will be described below to give an output which determines which strip the target is in. The location in the strip is determined by how far the scan has to proceed before the target comes into view. This information is also processed by suitable electronic circuits and gives information with respect to the location of the target in the strip. These two pieces of information uniquely locate the target and can be shown numerically or on visual displays as will be described in more detail in conjunction with the specific description of the invention.

It should be noted that the present invention operates by reason of a scan in which the image of each part of the space being scanned moves across the reticle. This is not a necessary requirement as it is relative motion which counts. Thus it is immaterial whether the reticle stands still and the image moves or the image stands still and the reticle moves. All that is needed is this relative motion. With a television type of raster it is normally simpler to move the image and keep the reticle stationary. However, with a spiral scan which is another modification of the invention it is simpler to keep the image stationary and move the reticle. Of course, both may move but nothing is gained by the added complication.

It will be apparent that detector sensitivity is multiplied by the number of strips. In the 100 line raster described this means an increase in sensitivity of two orders of magnitude.

Often it is not necessary to know the location of a target with the same precision in each of the two directions, for example, if a target is moving essentially across the field of view of the instrument horizontal precision is more important than vertical. On the other hand if the instrument were observing a small radiant target which changed very rapidly in elevation and less rapidly in azimuth the reverse would be true. The present instrument is equally useful in both cases. For example, suppose that it is necessary to know to 1 percent the location in one coordinate direction and to only 5 percent in the other. This would permit the use of a reticle with 20 strips and a scan rate so that the time of scanning along the strips was 100 times the time constant of the detector. The same instrument would be equally useful for precision azimuth or precision elevation data as the reticle can be turned to either of two 90° positions. In unusual cases where a diagonal motion of the target is encountered it is, of course, possible to orient the reticle with the strips parallel to this motion although ordinarily this presents problems in interpretation of the coordinates and so it is usual to have one coordinate horizontal and the other vertical. Even in the case of a 20 strip reticle it will be noted that the detector sensitivity or for equal sensitivity the number of scans per second can be increased by a factor of 20 which is more than one magnitude.

Not only does the present invention increase enormously scan rates, or for the same scan rate sensitivity, but an additional advantage results over infrared instruments in which the detector has to scan the full length of all of the lines of the raster. If scanning is done by moving the image it is only done in one direction whereas in the former type of scan the image must be moved from side to side and then in steps up and down which greatly complicates the drive of mirrors or other optical elements which are used to effect the scan, or of the detector if a moving detector type of instrument is used. This is an additional advantage and simplification of the instrument so that the increase in number of total scans per second or increase in sensitivity is not obtained at a sacrifice of other desirable characteristics but with an additional advantage in simplicity of apparatus design and operation. This is a rare occurrence in instruments which are usually compromises and constitutes a valuable additional advantage of the present invention.

Reference has been made to detectors and to electronic circuits. It is an advantage of the present invention that standard types of detectors and circuits of straight forward design and simple configuration may be used. This adds to the reliability of the instrument and makes possible very compact, light and rugged instruments well suited for field use.

The invention will be described in greater detail in conjunction with the drawings in which.

Figure 1:
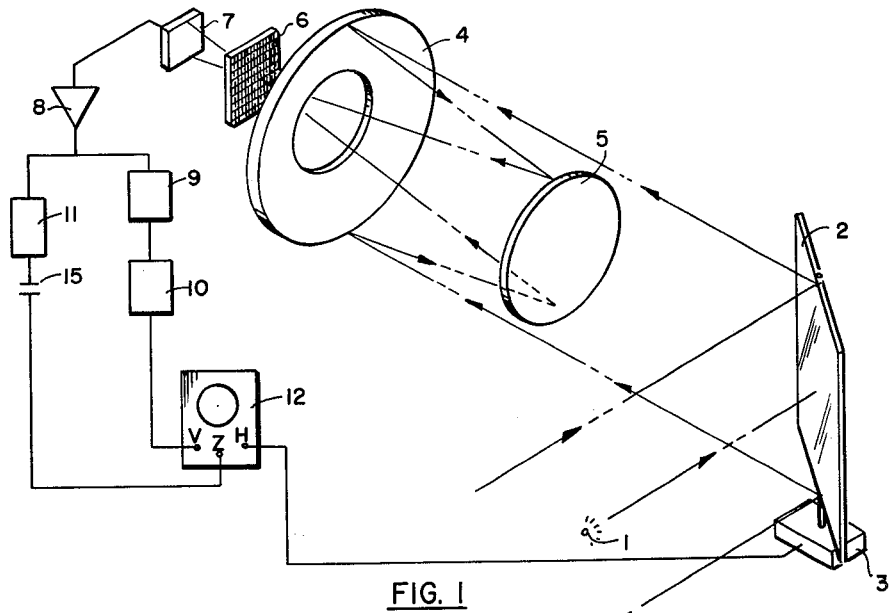
FIG. 1 is a diagrammatic perspective of one modification of the invention with a block diagram of one type of electronic circuit.

FIG. 1 illustrates a variant of the present invention in which the reticle is stationary and the image is moved thereover. The target is shown as a bright point source 1 radiation from which strikes a scanning mirror 2 which is oscillated by the driving means 3 through the scanning arc. The image of the field of view is formed on the reticle 6 by the Cassegrain collecting optics having a primary mirror 4 and a secondary mirror 5. Behind the reticle there is located a large detector 7, of the same size as the reticle. This is shown separated from the reticle for clarity though in practice the separation will be quite small.

Figure 2:
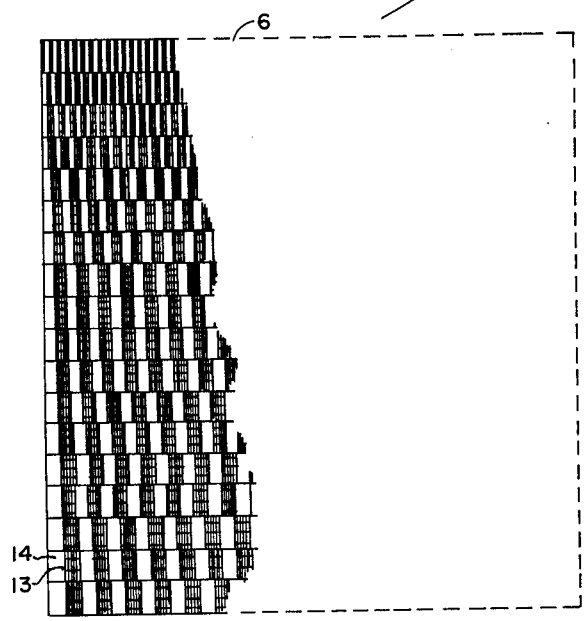
FIG. 2 is an enlarged view of the reticle of FIG. 1.

FIG. 1 being semidiagrammatic in nature the reticle bars are not shown as they appear on an enlarged scale in FIG. 2 which shows a portion of the reticle. It will be noted that the reticle is divided into 18 strips. For more accurate work the number of strips will ordinarily be somewhat larger but to simplify illustration a relatively small number of strips is shown. The strips are composed of opaque bars 13 and clear spaces 14. The width of the bars and hence the number in a strip changes, the bars being wider for the bottom strip and becoming progressively narrower. The number of bars are also shown much smaller than in practice for sake of clarity. In a practical reticle there might well be 100 bars in the bottom strip increasing to 200 or more in the top strip.

As the image is scanned across the reticle the detector, which may be for example a thermistor, always sees the whole of the reticle, and therefore radiation from the background of the space scanned will not be chopped as will a point source 1 as it moves will move along one of the strips. Scanning rate is determined by the time constant of the detector. If the detector has a time constant of 0.25 millisecond the scanning rate can be 0.1 second. The signal from the detector is amplified in an A.C. preamplifier 8. As the input does not respond to D.C. there will be no signal corresponding to the background but there will be a signal as soon as the image of the point source target starts moving across the reticle. This signal will be in the form of a square wave of the frequency determined by the particular strip along which the image of the detector moves. The amplified signal is then passed through an amplifier and clipper 9 which transforms the square wave signal into amplified square waves of constant amplitude. From the output of the amplifier and clipper a portion of the signal passes into an integrator 10 having a time constant sufficiently long so that it integrates pulses of even the lowest frequency strip but sufficiently short so that when the scanning mirror moves back to start a new scan, and as conventional blanks out detector signal during the retrace, the charge on the capacitor of the integrator leaks off to a predetermined zero value. Another portion of the signal passes through a differentiating circuit and one shot multivibrator 11. An oscilloscope 12 is shown as a display with the output of the integrator connected to the vertical deflection and the output of the multivibrator 11 connected through a capacitor 15 to the intensity input Z of the oscilloscope, shown for simplicity on the front of the scope although ordinarily this input is situated on the rear of the scope. The horizontal sweep is triggered by a signal from the scanning mirror so that one sweep corresponds to one scan. The scanning drive also applies a pulse of opposite polarity to the multivibrator 11 at the start of a new scan which resets it.

The frequency of the square wave from the image of the target source after clipping is integrated in the integrator 10 and the voltage therefrom is therefore proportional only to the number of square pulses and hence to the vertical position of the strip on the reticle along which the target image is moving. This voltage deflects the beam in the oscilloscope to the point corresponding to the vertical coordinate. At the same time the horizontal deflection plates sweep the electron beam across in synchronism with the scan. When there is no detector signal at the start of the scan there is no pulse from the multivibrator. As soon as the target strikes the first clear space in its strip the differentiated pulse will fire the multivibrator and there will be a pulse of proper polarity transmitted through the capacitor 15 to the intensity input of the oscilloscope. Accordingly the electron beam of the oscilloscope is turned on and a spot appears on the face of the scope the elevation being determined by the integration of the pulses over a full scan which is represented by the vertical component on the oscilloscope and a horizontal position corresponding to the amount of rotation before the image of the target strikes the first clear spot. Of course, the phosphor of the oscilloscope is of suitable persistence so that the spot builds up to a satisfactory intensity. The integrator and the vertical circuits of the oscilloscope are adjusted so that the verticle deflection is always proportional to the integration of the number of square pulses over a full scan and the deflection is therefore proportional only to the particular strip in which the target image is located and which determines the number of pulses counted in the full scan.

An oscilloscope has been shown as a convenient visual display. However, the information contained in the two output signals may be used for any other purposes such as indicators of the coordinates, actuation of a telemetering transmitter and the like. It may, therefore, be said that the present invention ends with the production of a signal from the detector which shows a train of square wave pulses of frequency corresponding to the strip along which the target image is moving and which starts with respect to the scanning sweep at a point which corresponds to the horizontal component. The particular electronic circuits shown are simply typical standard types which are useful in translating this information into a suitable indicating display.

Figure 3:
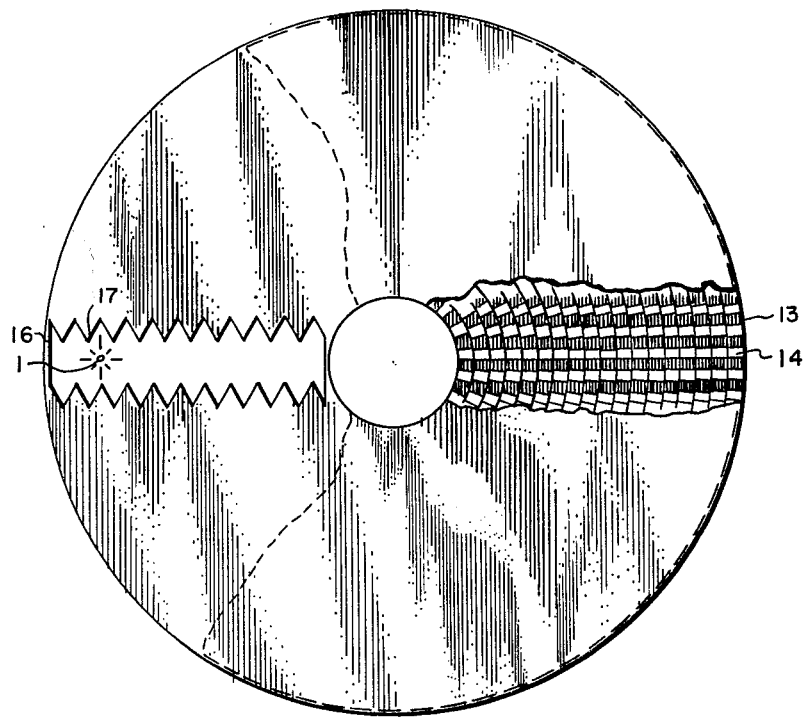
FIG. 3 is an elevation of a detector and rotating reticle.

FIG. 3 shows a rotating reticle with concentric annular strips. A mask 16 is provided which defines the field of view or this may be determined by the dimensions of the detector itself. In FIG. 3 the position of a target is shown. The image of the space to be searched remains stationary and the reticle rotates at a suitable speed resulting in the various annular strips being moved or scanned across the stationary image. As has been pointed out above the essential feature of the present invention is that there be relative movement between reticle and image and in this case the image stays still and the reticle moves. It will be noted that the edges of the mask aperture are provided with saw teeth 17. This is necessary if there is to be complete background rejection and the teeth must be designed in accordance with the requirement that each segment covers an integral number of opaque and clear spaces and that it be matched on the other edge of the mask by a corresponding segment. The background rejection by edge treatment is no part of the present invention as it constitutes the subject matter of the copending application of Monty Merlen, Serial No. 78,772 filed December 27, 1960.

Figure 4:
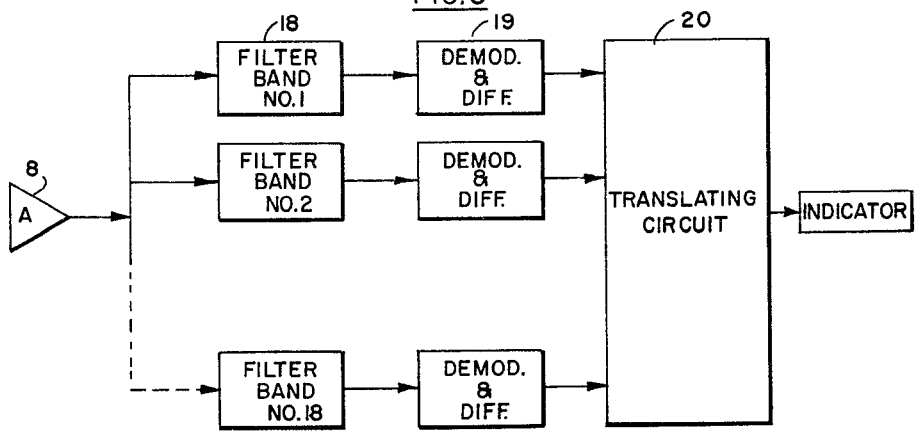
FIG. 4 is a block diagram of modified electronic circuits.

The particular strip in which a target image moves is determined by counting the number of pulses and integrating them. This is the preferred electrical method of utilizing the signals from the preamplifier 8. It is, however, only one electronic method. It is also possible to provide a series of filters connected in parallel, each tuned to the frequency of interruption of a particular strip. Such a modified procedure is illustrated in FIG. 4 the signal from the preamplifier 8 passing through the filters 18 corresponding to the different strips. After demodulating and differentiating in the demodulators and differentiators 19 the outputs are introduced into a translating circuit 20. Depending on the particular strip in which the target image is moving there will be an output from the corresponding filter and after differentiating and demodulating the translating circuit triggers a series of voltage sources, one corresponding to each filter. These can be connected to the vertical deflection of an oscilloscope and determine the height at which the scope electron beam is deflected. As in FIG. 1 the horizontal sweep of the oscilloscope is synthronized with scan and in the translating circuit for each frequency band there is a circuit corresponding to 11 in FIG. 1 which when connected to the intensity input of the oscilloscope will produce a flash when the image strikes the first clear space. The display on the face of the scope is, of course, the same as in FIG. 1.

By a suitable choice of circuits the modification according to FIG. 4 can be made to work. However, since we are dealing with bursts of pulses at different frequencies it is an extremely difficult matter to design a filter which will have the required degree of sharpness because the effect of the pulses on the basic repetition frequency results in a signal which makes the filter appear much broader than it would to a pure sine wave. The alternative of FIG. 4 is also far less advantageous because it requires a large number of filters and other circuits. It is shown, however, to illustrate that the particular design of electronic circuitry and output display is not a necessary limitation in the broadest aspects of the present invention and any circuitry may be used which will produce one output proportional to the frequency of the chopping of the target radiant beam and another proportional to the point in the scan at which the target first strikes the detector.

It should be noted that the present invention is designed to locate with a high degree of precision a single target. This is its primary function. When there is more than one target, unless they are so close together that they are considered as one, the present invention is not usually suitable. With two targets it may be possibile to separate them sufficiently by a slight aiming of the instrument. When a large number of targets are present the instrument is normally not useful. However, there are so many problems involving precision location of a single small target that the present invention has a wide applicability and its great simplicity, light weight and ruggedness renders it of great value for this important purpose.

Since the essential features of the present invention involve a relative movement of the particular type of reticle and the image of the space to be scanned it is not limited to particular scanning means. Two have been shown, one in FIG. 1 where an oscillating mirror is used and one in FIG. 3 where a moving reticle is used. These are only typical means for producing the relative movement of the image and reticle. For exambie, in FIG. 1 a stationary mirror can be used and mirrors 4 and 5 moved. Other optics such as dioptric optics may also be employed. Since the present invention is particularly designed for work in the infrared the achromatic catoptric optics of the Cassegrain type have been illustrated and this represents a preferred modification. However, essentially the invention in its broadest aspects is not limited to the design of optics or scanning mechanism and is not intended to be limited to the particular illustrations shown in the drawings.

It will be noted that in the specific illustrations the detector has been shown as large enough to see the whole of the reticle at the same time. This presents great advantages as stationary detectors do not introduce problems in noise generation which are encountered when moving detectors are used. However, if the detectors moves with the reticle it is not necessary that it be of the same dimensions. A long detector strip having only sufficient width to cover a full cycle or reticle pattern in the strip of largest bars and a reticle which may be of comparable dimensions can be moved together across a stationary image of the field of view. This also will produce the relative motion between image and reticle which is the necessary requirement of the present invention. The economy in detector size and reticle size is, however, ordinarily not worthwhile because it involves the complications of an oscillating detector which tends to create electrical noise unless a preamplifier is oscillated with it and in general is a design to be avoided for practical operation. However, even though the stationary detector is of large size it should be understood that the invention includes within its broadest scope smaller detectors so long as relative movement between image and reticle takes place.

I claim:
1. A radiant target locator comprising in combination and in optical alignment,
   (a) a radiation detector adapted to produce an electrical signal when illuminated,
   (b) a reticle composed of a series of strips of alternating opaque and transparent segments, the segments in any one strip being of the same size and each strip having segments of a different size and a different number of segments in the whole strip, each strip having two ends,
   (c) scanning means for producing relative movement between the reticle and an image of the field of view, said means producing scans along the strips, and
   (d) electronic processing means the input of which is connected to the output of the detector, the means including circuits for producing two signals from the detector output, one being a function of reticle chopping frequency and the second a function of the point on a particular strip first illuminated by the radiant target.
2. A locator according to claim 1 in which detector and reticle are stationary rectangles of comparable dimensions and the imaging means includes means for oscillatory movement of the field of view across the plane of the reticle in a direction along the reticle strips.
3. A locator according to claim 2 in which the imaging means comprise stationary imaging means and an oscillating plane mirror.
4. A locator according to claim 2 in which the radiation detector is a thermal infrared detector.
5. A locator according to claim 4 in which the imaging optics are catoptric.
6. A locator according to claim 1 in which the imaging means are stationary and the reticle moves.
7. A locator according to claim 6 in which the reticle is a rotatable disc reticle provided with annular strips of opaque and transparent segments.
8. A locator according to claim 1 in which the electronic processing means comprise amplifying and clipping means to produce square waves of constant amplitude and means for producing an electrical output proportional to the number of square waves in a scanning cycle.

References Cited in the file of this patent
UNITED STATES PATENTS

| | | |
|---|---|---|
| 1,781,799 | Baird | Nov. 18, 1930 |
| 2,016,036 | Fitz Gerald | Oct. 1, 1935 |
| 2,031,884 | Gray | Feb. 25, 1936 |
| 2,237,193 | Mosby | Apr. 1, 1941 |
| 2,931,911 | Nichols | Apr. 5, 1960 |
| 2,931,912 | MaCleish | Apr. 5, 1960 |
| 2,967,247 | Turk | Jan. 3, 1961 |
| 3,023,661 | McClushy et al. | Mar. 6, 1962 |